United States Patent [19]

Vacha

[11] Patent Number: 5,714,196
[45] Date of Patent: Feb. 3, 1998

[54] METHOD OF FORMING A STRIPPABLE POLYIMIDE COATING FOR AN OPTICAL FIBER

[75] Inventor: Lubos J. Vacha, Sturbridge, Mass.

[73] Assignee: Galileo Corporation, Sturbridge, Mass.

[21] Appl. No.: 623,684

[22] Filed: Mar. 29, 1996

Related U.S. Application Data

[63] Continuation-in-part of Ser. No. 277,870, Jul. 20, 1994, Pat. No. 5,567,219.

[51] Int. Cl.⁶ .................................. B05D 3/02; B05D 3/10
[52] U.S. Cl. .................................. 427/154; 427/163.2
[58] Field of Search .................................. 427/154, 155, 427/156, 163.2

[56] References Cited

U.S. PATENT DOCUMENTS

| | | | |
|---|---|---|---|
| 4,111,906 | 9/1978 | Jones et al. | 528/229 |
| 4,203,922 | 5/1980 | Jones et al. | 260/570 R |
| 4,274,709 | 6/1981 | Asai | 350/96.34 |
| 4,504,298 | 3/1985 | Yokota et al. | 65/3.11 |
| 4,737,012 | 4/1988 | Murakami et al. | 350/96.23 |
| 4,925,915 | 5/1990 | Mueller et al. | 528/353 |
| 5,183,534 | 2/1993 | Fjare et al. | 156/668 |
| 5,218,083 | 6/1993 | Gerber et al. | 523/353 |
| 5,248,519 | 9/1993 | Stoakley et al. | 427/96 |
| 5,298,291 | 3/1994 | Klinger et al. | 427/513 |
| 5,427,862 | 6/1995 | Ngo et al. | 428/435 |
| 5,470,943 | 11/1995 | Sakata et al. | 528/353 |
| 5,567,219 | 10/1996 | Vacha et al. | 65/432 |

FOREIGN PATENT DOCUMENTS

| | | |
|---|---|---|
| 59-174547 | 10/1984 | Japan . |
| 59-231503 | 12/1984 | Japan . |
| 62-178908 | 8/1987 | Japan . |
| 2 156 336 | 9/1984 | United Kingdom . |

*Primary Examiner*—Erma Cameron
*Attorney, Agent, or Firm*—Watson Cole Stevens Davis P.L.L.C.

[57] ABSTRACT

A method of making an optical fiber having a strippable polyimide coating includes the steps of drawing an optical fiber through curable polyamic acid solution to form a coating on the fiber and curing the coated fiber. The cured coating can subsequently be stripped from the optical fiber by exposing the cured coating to an organic polar solvent such as acetone. A fiber having a strippable polyimide coating is also provided. The method is particularly applicable to heavy metal fluoride fibers, and to chalcogenide fibers which carry optical signals in the infrared region.

23 Claims, No Drawings

METHOD OF FORMING A STRIPPABLE POLYIMIDE COATING FOR AN OPTICAL FIBER

RELATED APPLICATION

This application is a continuation in part of application Ser. No. 08/277,870, filed Jul. 20, 1994, now U.S. Pat. No. 5,567,219, which issued Oct. 22, 1996.

FIELD OF THE INVENTION

The present invention relates to a method of making a polyimide coated fiber. More specifically, the present invention relates to a method of coating an optical fiber with a strippable polyimide coating.

BACKGROUND OF THE INVENTION

Polyimide coatings for optical fibers are known. Such coatings provide excellent strength and durability to optical fibers as well as resistance to moisture. However, for many optical fiber applications, it is necessary to strip a portion of the polyimide coating to expose the underlying fiber. For example, when it is necessary to cleave a polyimide coated optical fiber, it is not possible to ultrasonically cleave the polyimide coating of the fiber if the coating is intact at the location where cleaving is desired. Removing a portion of the polyimide coating makes neatly cleaving the fiber much easier.

In medical laser technology it is also necessary to strip a polyimide coating from the tip of a laser power delivery polyimide-coated optical fiber. If the protective polyimide coating is not stripped prior to delivering laser power through the fiber, the tip of the fiber may undesirably overheat.

It is also desirable to strip protective polyimide coatings from adjacent tips of two separate optical fibers where a connection between the fibers is to be made.

While many polyimides can be employed as protective coatings, none have been known to be strippable from the fibers by using a solvent.

Known polyimides which are currently used to form coatings on optical fibers include those made from curing solutions of polyamic acid in 1-methyl-2-pyrollidinone (NMP). Other solutions for polyimide coatings on optical fibers were previously available from Ethyl Corporation, Baton Rouge, La., as EYMYD® RESINS HP-1125, HP-2000, HP-3000, HP-3025X, HP-4000, LT-1 and L-30N. Equivalent and similar low-temperature curing polyimide solutions are disclosed in U.S. Pat. No. 4,203,922 and are available from Poly-Materials, Inc., Jackson, Miss.

Unfortunately, none of the foregoing polyimide coatings are strippable in acetone or other commonly available and relatively safe and inexpensive solvents.

U.S. Pat. No. 4,111,906 discloses partially fluorinated polyimide films. Example III of the patent relates to a film made of the reaction product of 2,2-bis[4-(4-aminophenoxy)phenyl] hexafluoropropane and 2,2-bis[4-(3,4-dicarboxyphenoxy)-phenyl] hexafluoropropane dianhydride. However, nothing in the patent suggests forming an optical fiber coating with the polyimide nor does the patent suggest that the film of Example III could be dissolved with an organic polar solvent.

The only previously known methods to strip polyimide coatings from optical fibers involve the difficult and dangerous procedure of dipping the fiber tip, or the portion to be stripped, into hot, concentrated sulfuric acid, or burning off the coating with a flame at a temperature of from 500° C. to 1000° C. While burning is applicable to silica fiber, such temperatures are well above the softening point of fluoride glass and would thus result in melting of such fibers. A need therefore exists for a safer and easier method of stripping polyimide coatings. A need also exists for a method of forming a strippable polyimide coating which can be dissolved by organic polar solvents such as a ketone solvent. In addition, a need exists for an optical fiber having a polyimide coating which can be safely and easily stripped from the fiber with an inexpensive, common, polar organic solvent such as acetone.

SUMMARY OF THE INVENTION

The present invention is based upon the discovery that a particular polyimide coating formulation for an optical fiber, ZBLAN fiber, fluoroindate fiber, glass fiber, oxide glass fiber, chalcogenide fiber, multifiber bundle, hollow wave guide or silver chloride fiber, can be stripped from the fiber with acetone, methylene chloride, methyl ethyl ketone, other organic polar solvents, or compositions, solvents and mixtures based thereon.

It is an object of the present invention to overcome the problems of the prior art discussed above. More particularly, it is an object of the invention to provide a polyimide coated optical fiber wherein the coating can be easily and safely stripped from the fiber by exposure to a commonly available, relatively safe and inexpensive solvent.

It is a further object of the invention to provide a method for coating a fiber with a polyimide coating and subsequently stripping the coating from the fiber by exposing the coating to an organic polar solvent.

These and other objectives are accomplished according to the present invention by providing a method which comprises the steps of forming a coated fiber by drawing a fiber through a specific polyamic acid solution, and then drawing the coated fiber through a curing oven to form a cured coated fiber. The specific polyamic acid solution is cured under such conditions that only minimal crosslinking occurs between the substantially linear polyimide polymer units that make up the coating. Minimal crosslinking facilitates subsequent stripping of the coating, whereas a heavily crosslinked polyimide coating would be much more difficult, if not impossible, to strip. The specific polyamic acid solution, which is believed to be the first determined to be capable of stripping with an organic polar solvent, comprises the reaction product of 2,2-bis[4-(4-aminophenoxy)phenyl] hexafluoropropane and 2,2-bis[4-(3,4-dicarboxyphenoxy)-phenyl] hexafluoropropane dianhydride. Preferably, stoichiometrically equivalent amounts of both the amide and acid are used in the solution. The solution further includes a sufficient amount of aprotic solvent to dissolve the amide and acid so they can react together in solution. Preferably, the aprotic solvent is 1-methyl-2-pyrollidinone (NMP), which is considered relatively safe with respect to the family of aprotic solvents.

The polyamic acid solution has a curing temperature of below about 300° C. An oven temperature profile is selected which provides a set point temperature sufficient to cure the coating. Oven temperature profiles which provide set point temperatures of between 360° and 460° C. and maximum temperatures of between about 460° and about 525° C. are preferred according to one embodiment of the invention.

The temperature profile and draw rate through the oven are also selected such that the coated fiber is exposed to temperatures above the glass transition temperature of the fiber but under conditions which minimize crosslinking in the polyimide polymer and which minimize substantial crystallization of the fiber during curing. The result is a coated fiber exhibiting both low optical losses and high chemical durability, and having a cured coating which can be readily stripped with acetone or other organic polar solvents.

DETAILED DESCRIPTION OF THE INVENTION

According to the present invention, a method of making a fiber having a chemically strippable polyimide coating comprises the steps of forming a coated fiber by drawing a fiber through a specific polyamic acid solution such that the solution forms a coating on said fiber, and drawing the coated fiber through a curing oven to form a cured coated fiber.

One specific polyamic acid solution which upon curing forms a strippable coating according to the invention comprises the reaction product of 2,2-bis[4-(4-amino-phenoxy)phenyl] hexafluoropropane and 2,2-bis[4-(3,4-dicarboxyphenoxy)-phenyl] hexafluoropropane dianhydride. Preferably, stoichiometrically equivalent amounts of both the amide and acid are used in the solution. In addition, a sufficient amount of aprotic solvent is provided to dissolve the precursor amide and acid. A thermal reflux process can be used to form the polyamic acid solution from the precursor amide and acid.

The polyamic acid solution has a boiling point of about 203° C., a viscosity of between about 5000 and 7000 Cp at 25° C., a density of about 1.127 g/ml at 25° C., a honey color before curing. The resulting polyimide structure has a yellowish, brownish or golden color after curing has an average molecular weight of at least 5000 and preferably more than 10,000.

According to an embodiment of the invention, the coating is formed of a solution of polyamic acid in 1-methyl-2-pyrollidinone (NMP). Enough NMP should be used to keep the polyamic acid completely dissolved, or to dissolve precursor amide and acid if they have not yet reacted to form the polyamic acid.

The monomer composition and backbone structure of the polyamic acid solution yields a coating which cures at a temperature of below about 300° C. The coated fiber is drawn or otherwise passed through an oven to effect curing of the coating. An oven temperature profile is selected which provides a set point temperature sufficient to cure the coating without causing substantial crosslinking of the polyimide coating and avoiding substantial crystallization of the fiber.

The polyamic acid solution of the present invention is thermally unstable and should be kept in a closed bottle on dry ice to prevent premature imidization of the polyamic acid. Prior to coating the fiber, the solution should be brought to room temperature over a period of about one hour.

The polyamic acid solution may be diluted to adjust viscosity and to provide appropriate coating characteristics. For example, if a laser power delivery fiber having an outer diameter of about 330 μm is to be coated, typically no dilution of the polyamic acid solution is necessary. However, if a thinner fiber is to be coated, faster draw rates through the coating solution can be used but such rates require a less viscous coating solution. In such a situation, it is therefore preferable to dilute the coating solution so that better coating characteristics can be achieved. For example, if a heavy metal fluoride optical fiber having an outer diameter of about 125 μm is to be coated, it is preferable to dilute the polyamic acid solution with about 5% by weight diluent based on the weight of the polyamic acid solution.

One suitable diluent comprises a 19:1 weight % ratio of methyl ethyl ketone to NMP, respectively. If diluent is used, it is preferred to add the diluent as soon as the polyamic acid solution reaches room temperature, and just prior to coating the fiber. Fiber coating should commence within 30 minutes of diluting the polyamic acid solution.

According to an embodiment of the invention, the coated fiber has a polyimide coating thickness of between about 2 and about 20 microns. More specifically, the coated fiber has a polyimide coating thickness of about 10 microns. Such coating thicknesses offer excellent chemical durability, minimize the time and temperature needed for curing and avoid the creation of pinholes in the coating. When thin coatings are provided, however, concentricity becomes extremely important and must continually be monitored and fine-tuned in a known manner.

The draw rate of the polyimide coated fiber through the curing oven will depend upon a number of factors, including the temperature profile through the oven, the length of the oven, the thickness of the coating, and the curing temperature. Fast draw rates desirably result in increased production of coated fiber. Fast draw rates in combination with low curing temperatures also prevent substantial crystallization of the fiber by minimizing exposure of the fiber to temperatures above its glass transition point.

According to various embodiments of the invention, the coated fiber may be drawn through a curing oven at various rates ranging between about 1 and about 12 meters per minute. In a particular embodiment coated fiber may be drawn through the oven at a rate of between about 2 and about 6 meters per minute. In yet another embodiment, the coated fiber is drawn through an oven at a rate of between about 2 and about 3 meters per minute. The fiber may also be drawn through the oven two or more times to effect curing of the coating. According to an embodiment of the invention the fiber is exposed to the complete oven temperature profile for between about 5 and about 30 seconds. Pressures lower than atmospheric may also be maintained in the oven, if deemed necessary, to accelerate solvent removal.

According to the present invention, the heating profile provided in the oven yields a set point temperature of between about 360° C. and about 460° C. at a central location in the oven. In one embodiment, the oven temperature profile has a set point of about 390° C. and a maximum fiber exposure temperature of about 460° C. for curing the coating solution of polyamic acid in NMP. Maximum temperatures of between about 460° and 480° C. are preferred and provide resultant polyimide weights of about 24% after cure. Complete curing of the polyimide coating and removal of the NMP solvent can thus be provided and enables maximum protection of the fiber against moisture.

To avoid or minimize crystallization of the fiber, the fiber should be exposed to the maximum temperature for only a short time. Unfortunately, most ovens employing a resistance winding have a high temperature region, usually near the center of the oven. Thus, to provide a temperature profile set point of between 390° C. and 460° C., the fiber will likely be exposed to a maximum temperature of between about 460° C. and 525° C., respectively, in typical curing ovens. The maximum temperature range of between about 460° and about 525° C. is preferred according to one embodiment of the invention. These maximum temperatures are above the glass transition temperature of heavy metal fluorinated fibers. It is desirable for a particular fiber composition to have a maximum temperature exposure about 100° greater than the fiber glass transition temperature.

According to an embodiment of the invention, heavy metal fluorinated glass fibers are used having glass transition temperatures of between about 200° and about 400° C., typically 265° C. It is therefore advantageous to minimize fiber exposure to the maximum temperatures. According to the invention, exposure times of between about five and about seven seconds have shown little effect on crystallization of the fiber. It is believed that solvent evaporation and polymerization of the coating absorbs much of the heat and protects the fiber from crystallization.

To cure the present polyamic acid solution on a fiber having an outer diameter of about 125 μm, one exemplary method involves drawing the fiber through a curing oven having a maximum internal temperature of about 525° C. at a rate of about 10 meters per minute. Depending upon the length of the oven, the typical exposure time of the fiber to the oven atmosphere is about 5 to 10 seconds.

To cure the present polyamic acid solution on a fiber having an outer diameter of about 330 μm, one exemplary method involves drawing the fiber through a curing oven having a maximum internal temperature of about 460° C. at a rate of about 2.5 meters per minute. Depending upon the length of the oven, the typical exposure time of the fiber to the oven atmosphere is about 30 seconds.

The polyimide coated fiber can further be coated with additional protective coatings. An epoxy acrylate coating may be subsequently provided to even further enhance the protection of the fiber.

Methylene chloride and methylene chloride based solvents such as paint stripper are effective stripping compositions for both the polyimide coating of the invention and for epoxy acrylate coatings. Methylene chloride and methylene chloride based solvents are therefore preferred compositions for stripping such two-layer coatings.

In addition to methylene chloride, other stripping solvents which can be used include organic polar solvents, particularly ketones. Methyl ethyl ketone and dimethyl ketone (acetone) are both extremely effective in stripping the polyimide coating of the invention. A fiber having the polyimide coating described herein can be dipped in, e.g. acetone for one minute and wiped clean with a tissue resulting in complete removal of the coating where the coating contacted the solvent. It has been found that heating is not required with acetone or methylene chloride solvents. It is expected that heating is not required if methyl ethyl ketone is used as the solvent.

Old acetone appears to absorb moisture from the surrounding atmosphere or otherwise becomes less effective for stripping. Accordingly, fresh acetone at room temperature is preferred as the solvent.

Other suitable stripping solvents include compositions, mixtures, solvents and commercially available paint strippers based on organic polar solvents.

It has also been determined that none of water, methanol, or trichloroethylene can be used to strip the present coating. Even when heated to 40° C., both methanol and trichloroethylene fail to strip the present coating from a fiber.

The method of the present invention is suited for glass fibers and preferably for optical fibers including heavy metal fluoride fibers (including so-called ZBLAN fibers and fluoroindate fibers), chalcogenide fibers, silver chloride fibers and silica fibers known to those skilled in the art. Herein, the term optical fibers includes silica fibers, oxide glass fibers, other glass fibers, heavy metal fluoride fibers, chalcogenide fibers, multifiber bundles, hollow wave guides and silver chloride fibers, but does not include, for example, carbonaceous filaments.

The present invention may be more fully understood with reference to the Examples which follow. The invention is not intended to be limited to the embodiments shown and discussed in the Examples below but should be considered as contemplating all modifications within the purview of an ordinary artisan.

EXAMPLES

To a stirred solution of 0.933 g (1.8 mmole) of 2,2-bis [4-(4-amino-phenoxy)phenyl] hexafluoropropane in 4.0 g of dimethylacetamide was slowly added portionwise 1.130 g (1.8 mmole) 2,2-bis[4-(3,4-dicarboxyphenoxy)-phenyl] hexafluoropropane dianhydride at such a rate that each portion of dianhydride was allowed to dissolve before the next portion was added. The reaction was run under a nitrogen blanket and was cooled in a water bath. The residual dianhydride was washed into the reaction flasks with an additional 3 ml of dimethylacetamide to give a 19% by weight solids solution. The reaction mixture was stirred for three hours after the last of the dianhydride had been added and then was transferred to a vacuum oven. The solvent was removed at 100° C. The curing temperature of the coating was found to be less than 300° C.

The resulting solution was coated onto a heavy metal fluoride optical fiber having a diameter of 125 μm. The coating thickness was about 10 μm. The fiber was then drawn through a curing oven having a maximum internal temperature of about 525° C. at a rate of about 10 meters per minute. The exposure time of the fiber to the oven atmosphere was about 7 to 8 seconds.

Cured fibers were then subjected to and survived a deionized water bend test. The fibers were bent at a bend radius of 2.0 inches and the bent portions of the fibers were submerged in deionized water. The fibers all survived over 450 hours in the deionized water without breaking. The coated fibers exhibited very low water absorption, very good adhesion to glass and excellent wear resistance. The polyimide coatings were effectively stripped with room temperature fresh acetone after immersion in the acetone for one minute.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method of making a coated optical fiber having a strippable polyimide coating said method comprising the steps of:

providing an optical fiber;
drawing said fiber through a fluorinated polyamic acid coating solution such that the solution forms a coating on said fiber, said coating solution comprising the reaction product of 2,2-bis(4-(4-amino-phenoxy) phenyl) hexafluoropropane and 2,2-bis(4-(3,4-dicarboxyphenoxy) phenyl) hexafluoropropane dianhydride which forms a polyimide coating on said fiber upon curing, said polyimide coating being strippable from said fiber when exposed to a stripping solvent selected from the group consisting of organic polar solvents;

curing said coating on said fiber to form a cured polyimide coating substantially free of crosslinking; and stripping said cured polyimide coating by exposing said cured coating to said solvent for a time and at a temperature such that said cured coating dissolves.

2. The method according to claim 1, wherein said curing step comprises drawing coated fiber through a curing oven.

3. The method according to claim 1, wherein said polyamic acid solution comprises an aprotic solvent.

4. The method according to claim 1, wherein said polyamic acid coating solution includes 1-methyl-2-pyrollidinone as a solvent.

5. The method according to claim 1, wherein said solvent is selected from the group consisting of ketones.

6. The method according to claim 1, wherein said fiber is a heavy metal fluoride optical fiber.

7. The method according to claim 1, further comprising the step of providing said polyamic acid solution by dissolving said 2,2-bis(4-(4-amino-phenoxy)phenyl) hexafluoropropane in an aprotic solvent to form a first solution, dissolving said 2,2-bis(4-(3,4-dicarboxyphenoxy)phenyl) hexafluoropropane dianhydride in an aprotic solvent to form a second solution, and mixing said first and second solutions together.

8. The method according to claim 7, wherein said step of providing a polyamic acid solution comprises heating said aprotic solvents.

9. The method according to claim 1, further comprising the step of providing said polyamic acid solution by mixing a first solid comprising said 2,2-bis(4-(4-amino-phenoxy) phenyl) hexafluoropropane with a second solid comprising said 2,2-bis(4-(3,4-dicarboxyphenoxy)phenyl) hexafluoropropane dianhydride and subsequently dissolving the mixture of said first and second solids in an aprotic solvent.

10. The method according to claim 9, wherein said step of providing a polyamic acid solution comprises heating said aprotic solvent.

11. A method according to claim 1, wherein said step of curing comprises heating said polyamic acid solution coating on said fiber for a time and at a temperature such that said polyamic acid cures.

12. The method according to claim 1, wherein the step of stripping said polyimide coating comprises exposing said coating to acetone for a time and at a temperature such that said coating dissolves.

13. The method according to claim 1, wherein said fiber has a glass transition temperature and said curing step comprises heating the coated fiber to a temperature above the glass transition temperature of the fiber for a period of time such that crystallization of the fiber is minimized.

14. The method of claim 1 wherein the molecular weight of the polyamic acid in the solution is at least about 5,000.

15. The method of claim 1 wherein the molecular weight of the polyamic acid in the solution is at least about 10,000.

16. The method of claim 1, wherein said stripping solvent is selected from the group consisting of dimethyl ketone, methyl ethyl ketone, methylene chloride, and mixtures thereof.

17. The method of claim 1, wherein the coating is insoluble in water.

18. A method of making a coated optical fiber having a strippable polyimide coating said method comprising the steps of:

providing an optical fiber;

drawing said fiber through a fluorinated polyamic acid solution such that the solution forms upon curing a polyimide coating on said fiber, said coating solution comprising the reaction product of 2,2-bis(4-(4-amino-phenoxy)phenyl) hexafluoropropane and 2,2-bis(4-(3,4-dicarboxyphenoxy) phenyl) hexafluoropropane dianhydride, said polyimide coating being strippable from said fiber when exposed to a stripping solvent selected from the group consisting of organic polar solvents;

curing said coating on said fiber to form a cured polyimide coating substantially free of crosslinking; and stripping said cured polyimide coating by exposing said cured coating to said solvent for a time and at a time and at a temperature such that said cured coating dissolves.

19. The method according to claim 18, further comprising wherein the step of stripping said cured polyimide coating comprises exposing said cured coating to acetone for a time and at a temperature such that said cured coating dissolves.

20. The method according to claim 18, wherein said solvent is selected from the group consisting of dimethyl ketone, methyl ethyl ketone, methylene chloride, and mixtures thereof.

21. The method according to claim 18, wherein the coating is insoluble in solvents selected from the group consisting of water, methanol and trichloroethylene.

22. The method of claim 18, wherein the molecular weight of the polyamic in solution is at least about 5,000.

23. The method of claim 18, wherein the molecular weight of the polyamic in solution is at least about 10,000.

* * * * *